US009787368B2

(12) United States Patent
Wu

(10) Patent No.: US 9,787,368 B2
(45) Date of Patent: Oct. 10, 2017

(54) ANTENNA HAVING PASSIVE BOOSTER FOR NEAR FIELD COMMUNICATION

(71) Applicant: MEDIATEK INC., Hsin-Chu (TW)

(72) Inventor: Shun-Te Wu, Hsinchu County (TW)

(73) Assignee: MEDIATEK INC., Hsin-Chu (TW)

(*) Notice: Subject to any disclaimer, the term of this patent is extended or adjusted under 35 U.S.C. 154(b) by 0 days.

(21) Appl. No.: 15/294,791

(22) Filed: Oct. 17, 2016

(65) Prior Publication Data
US 2017/0134072 A1 May 11, 2017

Related U.S. Application Data

(60) Provisional application No. 62/251,799, filed on Nov. 6, 2015, provisional application No. 62/336,776, filed on May 16, 2016.

(51) Int. Cl.
*H04B 5/00* (2006.01)
*H04W 4/00* (2009.01)

(52) U.S. Cl.
CPC .......... *H04B 5/0081* (2013.01); *H04W 4/008* (2013.01)

(58) Field of Classification Search
CPC .............................. H04B 5/0081; H04W 4/008
See application file for complete search history.

(56) References Cited

U.S. PATENT DOCUMENTS

| | | | | |
|---|---|---|---|---|
| 8,922,438 | B2* | 12/2014 | Nakano | H01Q 1/2225 343/702 |
| 9,001,001 | B2* | 4/2015 | Nakano | G06K 7/10009 343/866 |
| 9,537,200 | B2* | 1/2017 | Kato | H01Q 1/38 |
| 9,577,335 | B2* | 2/2017 | Yosui | H01Q 1/2225 |
| 2006/0267773 | A1* | 11/2006 | Roque | G06K 19/07728 340/572.7 |
| 2008/0191332 | A1* | 8/2008 | Koyama | H01L 23/5227 257/679 |
| 2008/0191959 | A1* | 8/2008 | Koyama | H01Q 1/2283 343/873 |
| 2011/0063184 | A1* | 3/2011 | Furumura | G06K 19/07749 343/856 |
| 2012/0091821 | A1* | 4/2012 | Kato | H01Q 1/38 307/104 |
| 2013/0068507 | A1* | 3/2013 | Singh | H05K 1/16 174/251 |
| 2013/0075477 | A1* | 3/2013 | Finn | G06K 19/07794 235/492 |
| 2013/0099994 | A1* | 4/2013 | Yosui | H01Q 1/243 343/866 |
| 2013/0126622 | A1* | 5/2013 | Finn | G06K 19/07771 235/492 |
| 2014/0091149 | A1* | 4/2014 | Finn | G06K 19/07769 235/492 |

(Continued)

*Primary Examiner* — Devan Sandiford
(74) *Attorney, Agent, or Firm* — Winston Hsu

(57) ABSTRACT

A near field communication (NFC) antenna includes a ferrite sheet, an antenna coil, and a passive booster. The antenna coil is formed on the ferrite sheet, and includes an inner sub-coil. The passive booster is formed on the ferrite sheet. A projection of the passive booster onto a plane does not overlap with a projection of an area enclosed by the inner sub-coil onto the plane. The projection of the passive booster onto the plane overlaps with a projection of the antenna coil and a projection of the ferrite sheet onto the plane.

11 Claims, 12 Drawing Sheets

(56) References Cited

U.S. PATENT DOCUMENTS

| | | | |
|---|---|---|---|
| 2014/0104133 A1* | 4/2014 | Finn | H05K 3/103 |
| | | | 343/866 |
| 2014/0209691 A1* | 7/2014 | Finn | G06K 19/07769 |
| | | | 235/492 |
| 2014/0247188 A1* | 9/2014 | Nakano | H01Q 1/243 |
| | | | 343/702 |
| 2015/0021402 A1* | 1/2015 | Finn | G06K 19/07794 |
| | | | 235/492 |
| 2015/0070224 A1* | 3/2015 | Nakano | H01Q 1/2225 |
| | | | 343/702 |
| 2015/0235122 A1* | 8/2015 | Finn | G06K 19/07794 |
| | | | 235/439 |
| 2015/0269477 A1* | 9/2015 | Finn | G06K 19/07794 |
| | | | 235/492 |
| 2016/0118711 A1* | 4/2016 | Finn | G06K 19/07769 |
| | | | 343/867 |
| 2016/0164178 A1* | 6/2016 | Komachi | H01Q 1/38 |
| | | | 343/702 |
| 2017/0104259 A1* | 4/2017 | Yosui | H01Q 1/2216 |

* cited by examiner

Antenna coil current direction

Magnetic field direction

Antenna coil current direction

Magnetic field direction for each coil current

US 9,787,368 B2

ANTENNA HAVING PASSIVE BOOSTER FOR NEAR FIELD COMMUNICATION

CROSS REFERENCE TO RELATED APPLICATIONS

This application claims the benefit of U.S. Provisional Application No. 62/251,799, filed on Nov. 6, 2015, and U.S. Provisional Application No. 62/336,776, filed on May 16, 2016, the contents of which are incorporated herein.

BACKGROUND

Near Field Communication (NFC) is a standards-based short-range wireless connectivity technology for electronic devices to establish communication with each other by bringing them into close together (typically 0-5 centimeters). NFC is possible between NFC devices and also between an NFC device and an unpowered NFC device, which is called a tag and similar to a Radio-Frequency Identification (RFID) tag.

NFC antennas behave as inductors to operate at low frequency (long wavelengths) on electronic devices based on mutual coupling. In general, larger inductance of the NFC antenna brings better performance thereof. Typically, a loop of wire around a material gives a strong magnetic field within the loop. Hence, NFC antennas are often simply loops of wire or a coil, occupying as much surface area as the electronic device allows.

Therefore, how to increase the magnetic field induced by the NFC antenna has become a topic in the industry.

SUMMARY

It is therefore an objective of the present invention to provide an antenna having passive booster for near field communication (NFC).

The present invention discloses an NFC antenna including a ferrite sheet, an antenna coil, and a passive booster. The antenna coil is formed on the ferrite sheet, and includes a most inner sub-coil and a plurality of sub-coils enclosing the most inner sub-coil. The passive booster is formed on the ferrite sheet. A projection of the passive booster onto a plane does not overlap with a projection of an area enclosed by the first sub-coil onto the plane. The projection of the passive booster onto the plane overlaps with a projection of the antenna coil, and overlaps with a projection of the ferrite sheet onto the plane Under such a structure, the passive booster induces additional magnetic fields to be superposed with a magnetic field induced by the antenna coil, which increases the magnetic field of the NFC antenna to improve antenna performance.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
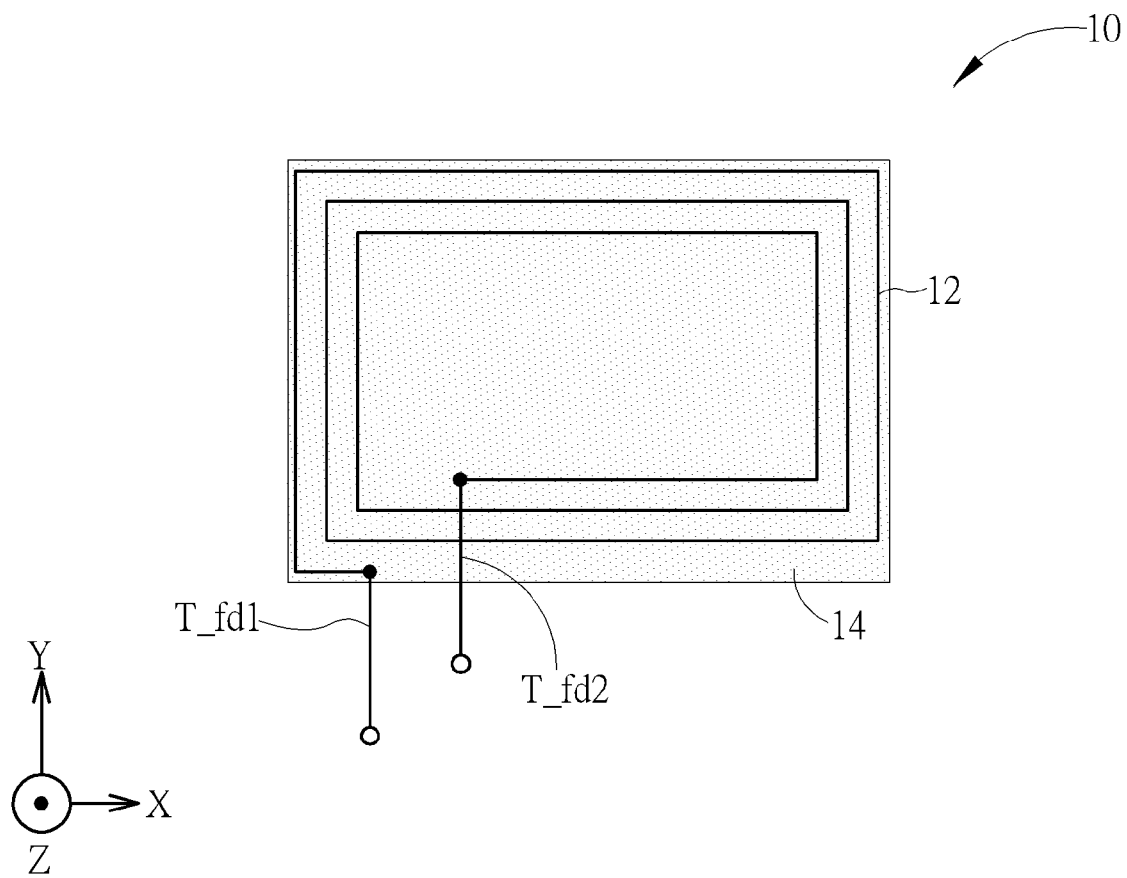
FIG. 1 illustrates an NFC antenna and corresponding antenna coil current direction and magnetic field direction.
Figure 1:
Figure 1:
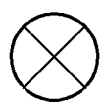

FIG. 1 illustrates a near-field communication (NFC) antenna 10 and corresponding antenna coil current direction and induced magnetic field direction. The NFC antenna 10 may be connected to a wireless communication module of an NFC capable electronic device to perform NFC with another NFC capable electronic device. The NFC antenna 10 includes an antenna coil 12 and a ferrite sheet 14. The antenna coil includes a plurality of sub-coils, two feed traces T_fd1 and T_fd2 connected to two feed points to be fed with a radio-frequency signal, wherein the radio-frequency signal may be a single-ended signal or a differential signal. The antenna coil 12 operates as an inductor to perform wireless communication by mutual coupling.

In FIG. 1, the feed trace T_fd1 is connected to an outer sub-coil of the antenna coil 12, the feed trace T_fd2 is connected to an inner sub-coil of the antenna coil 12, and given that the antenna coil current directs clockwisely. Based on the right-hand rule, the magnetic field induced by the antenna coil current directs toward the background of FIG. 1 (i.e. −Z direction). In one embodiment, the feed trace T_fd2 may be connected to outer sub-coil, the feed trace T_fd1 may be connected to the inner sub-coil, so the antenna coil current directs counterclockwisely, and the magnetic field induced by the antenna coil current directs out of the background of FIG. 1 (i.e. +Z direction). In other words, the feed trace T_fd1 may be connected to either the inner sub-coil or the outer sub-coil, and the feed trace T_fd2 may be connected to either the outer sub-coil or the inner sub-coil.

Figure 2:
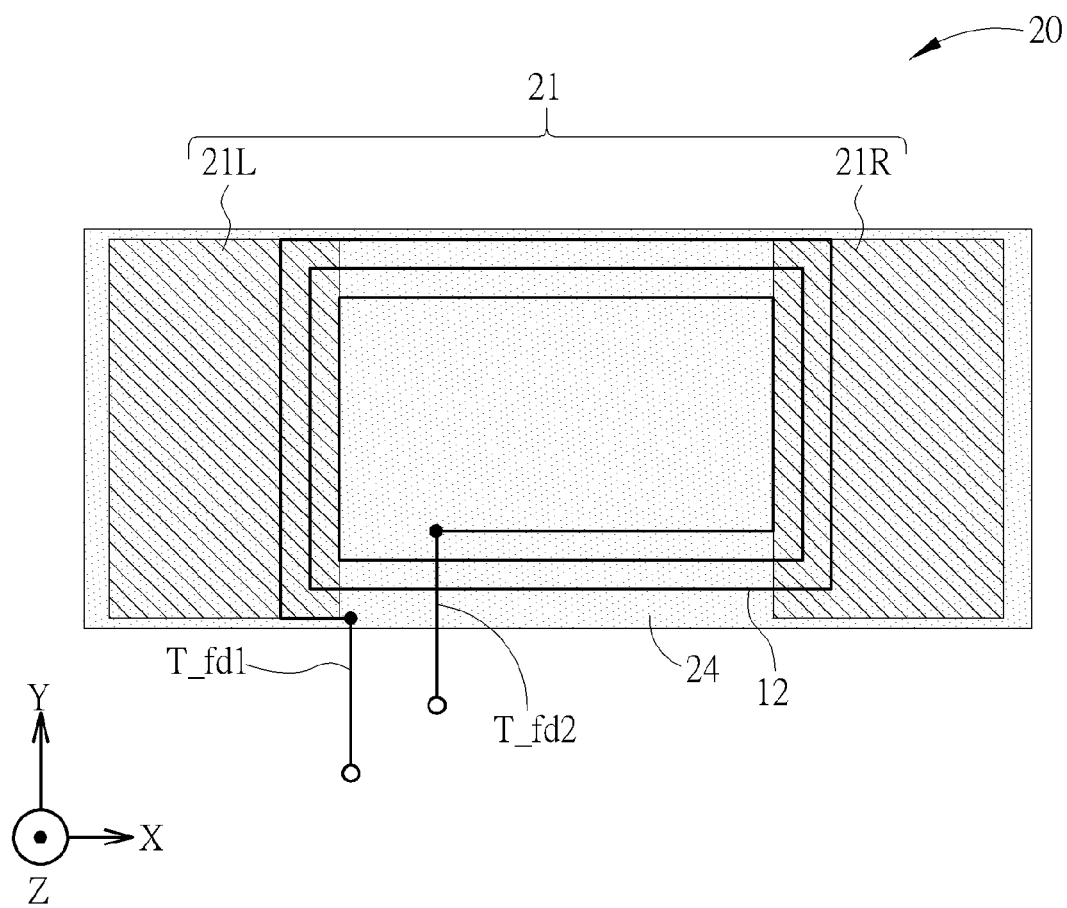
FIG. 2 illustrates a perspective view of an NFC antenna having passive booster and corresponding antenna coil current direction and magnetic field direction according to an embodiment of the present invention.
Figure 2:
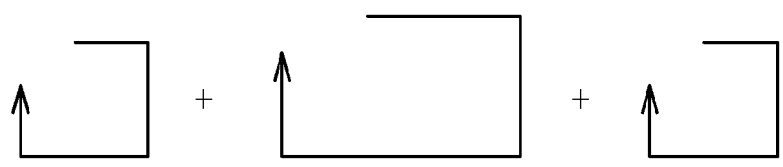
Figure 2:

FIG. 2 illustrates an NFC antenna 20 and corresponding antenna coil current direction and induced magnetic field direction according to an embodiment of the present invention. The NFC antenna 20 includes the antenna coil 12, a ferrite sheet 24 and a passive booster 21. The passive booster 21 includes conductive sheets 21L and 21R.

Given that the coil current on the left portion of the antenna coil 12 directs toward +Y direction, and the coil current on the right portion of the antenna coil 12 directs toward −Y direction. Under a structure of the NFC antenna 20, mutual coupling may be induced between the passive booster 21 and the antenna coil 12. Based on Lenz's law, a coil current induced on the right portion of the conductive sheet 21L directs opposite to the coil current on the left portion of the antenna coil 12 (i.e., −Y direction), so the coil current induced on the conductive sheet 21L directs clockwisely. A coil current induced on the left portion of the conductive sheet 21R directs opposite to the coil current on the right portion of the antenna coil 12 (i.e., +Y direction), so the coil current induced on the conductive sheet 21R directs clockwisely. As a result, magnetic fields induced by the coil currents on the antenna coil 12 and the conductive sheets 21L and 21R direct toward the background of FIG. 2 (i.e. −Z direction). Since the magnetic fields induced by the coil currents on the antenna coil 12 and the conductive sheets 21L and 21R direct toward the same direction, they may be superposed together, which produces an effective magnetic field of the NFC antenna 20 greater than the magnetic field of the NFC antenna 10. In other words, the conductive sheets 21L and 21R operate as passive boosters for increasing the magnetic field of the NFC antenna 20, which improves antenna performance.

An area of the ferrite sheet 24 is substantially greater than the area of the antenna coil 12. A right edge of the conductive sheet 21L is aligned with the inner sub-coil of the antenna coil 12, and an upper, lower and left edge of the conductive sheet 21L are within the area of the ferrite sheet 24. Similarly, a left edge of the conductive sheet 21R is aligned with the inner sub-coil of the antenna coil 12, and an upper, lower and right edge of the conductive sheet 21R are within the edges of the ferrite sheet 24. In other words, projections of the conductive sheets 21L and 21R onto X-Y plane do not overlap with a projection of an area enclosed by the inner sub-coil of the antenna coil 12 onto the X-Y plane, and the projections of the conductive sheets 21L and 21R onto the X-Y plane are within the projection of the ferrite sheet 24 onto the X-Y plane.

Specifically, an induced magnetic field directs from the background of FIG. 2 (i.e., +Z direction) if a conductive sheet overlaps with the projection of the area enclosed by the inner sub-coil of the antenna coil 12 onto the X-Y plane, which cancels a portion of the magnetic field induced by the coil current on the antenna coil 12. Therefore, the projections of the conductive sheets 21L and 21R onto X-Y plane should not overlap with the projection of the area enclosed by the inner sub-coil of the antenna coil 12 onto the X-Y plane. On the other hand, magnetic flux induced by the conductive sheets 21L and 21R may be distributed within the projection of the ferrite sheet 24 onto the X-Y plane if the projections of the conductive sheets 21L and 21R onto the X-Y plane are within the projection of the ferrite sheet 24 onto the X-Y plane, which maximizes the magnetic fields induced by the conductive sheets 21L and 21R.

In short, the present invention utilizes the passive booster 21 to induce additional magnetic fields to be superposed with the magnetic field induced by the coil current on the antenna coil 12, which increases the magnetic field of the NFC antenna 20 and therefore improves antenna performance. Those skilled in the art may make modifications and alterations accordingly, which is not limited to the embodiments of the present invention.

Figure 3:
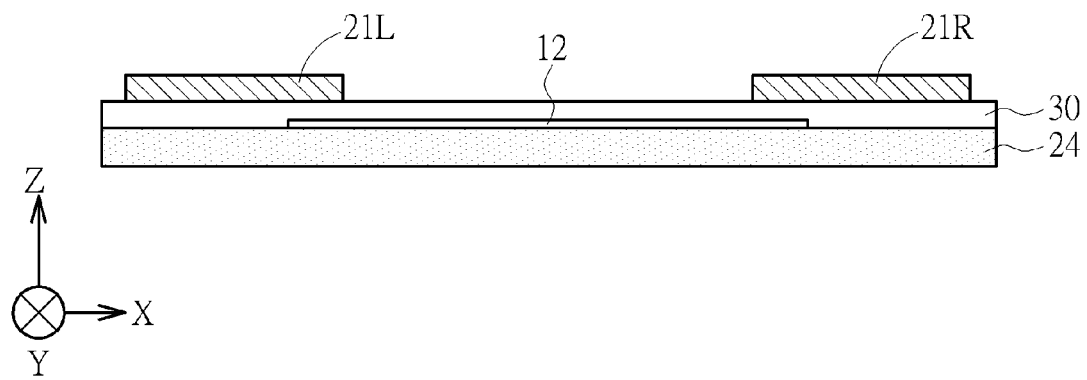
FIG. 3 and FIG. 4 illustrate a side view of the NFC antenna in FIG. 2 according to an embodiment of the present invention, respectively.
Figure 4:
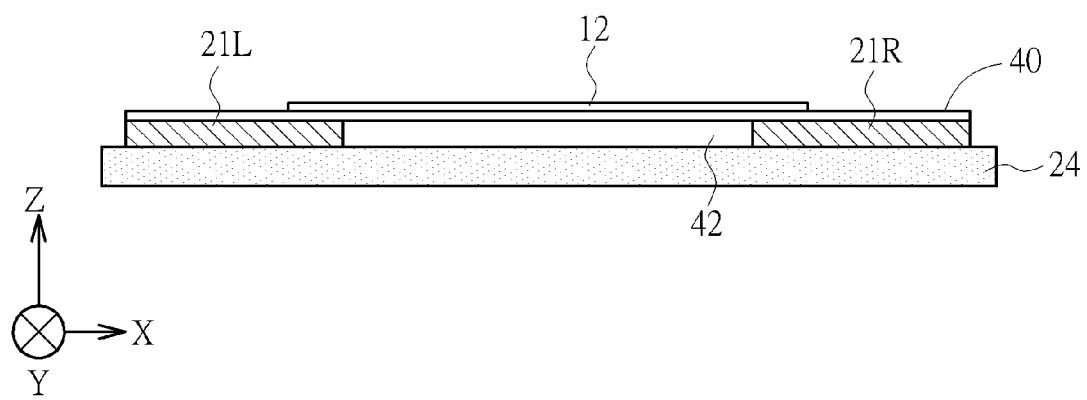

FIG. 3 and FIG. 4 illustrate side views of various implementations of the NFC antenna 20 shown in FIG. 2. In FIG. 3, the ferrite sheet 24 is formed in the bottom, the antenna coil 12 is formed on the ferrite sheet 24, and the conductive sheets 21L and 21R are formed on the antenna coil 12, wherein a dielectric material 30 is formed between the antenna coil 12 and the conductive sheets 21L and 21R to isolate them. In FIG. 4, the ferrite sheet 24 is formed in the bottom, the conductive sheets 21L and 21R are formed on the ferrite sheet 24, and the antenna coil 12 is formed on the conductive sheets 21L and 21R, wherein a dielectric material 40 is formed between the antenna coil 12 and the conductive sheets 21L and 21R for isolation. Another dielectric material 42 is formed between the ferrite sheet 24, the conductive sheets 21L and 21R and the dielectric material 40. In other words, the antenna coil 12 and the conductive sheets 21L and 21R are formed on the same side of the ferrite sheet 24, either the antenna coil 12 or the conductive sheets 21L and 21R is formed adjacent to the ferrite sheet 24, and there is a dielectric material for isolating the antenna coil 12 and the conductive sheets 21L and 21R.

Figure 11:
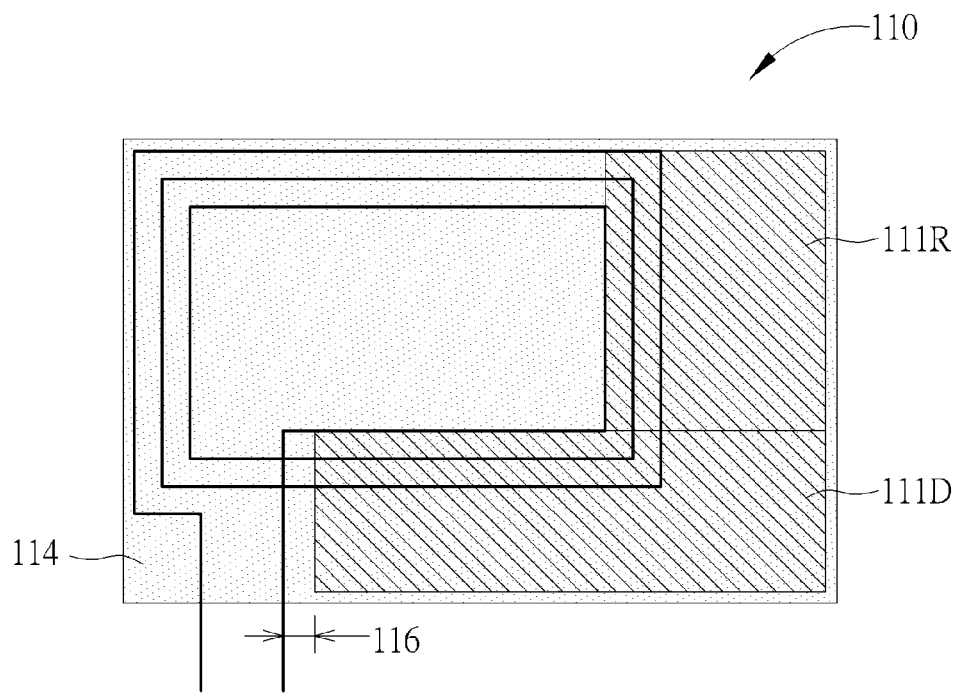
Figure 12:
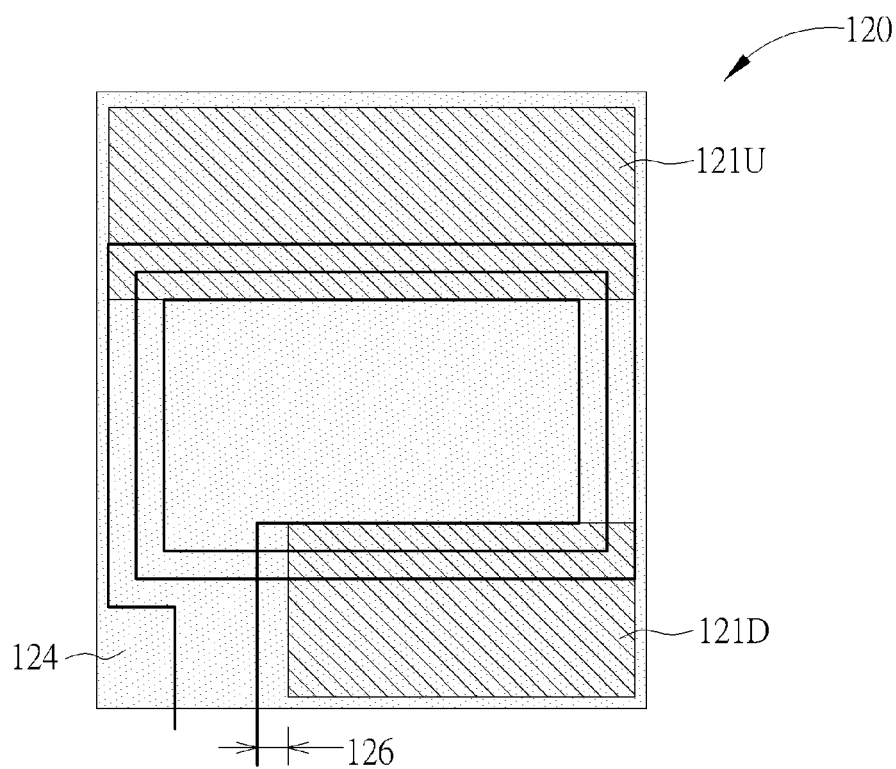
Figure 13:
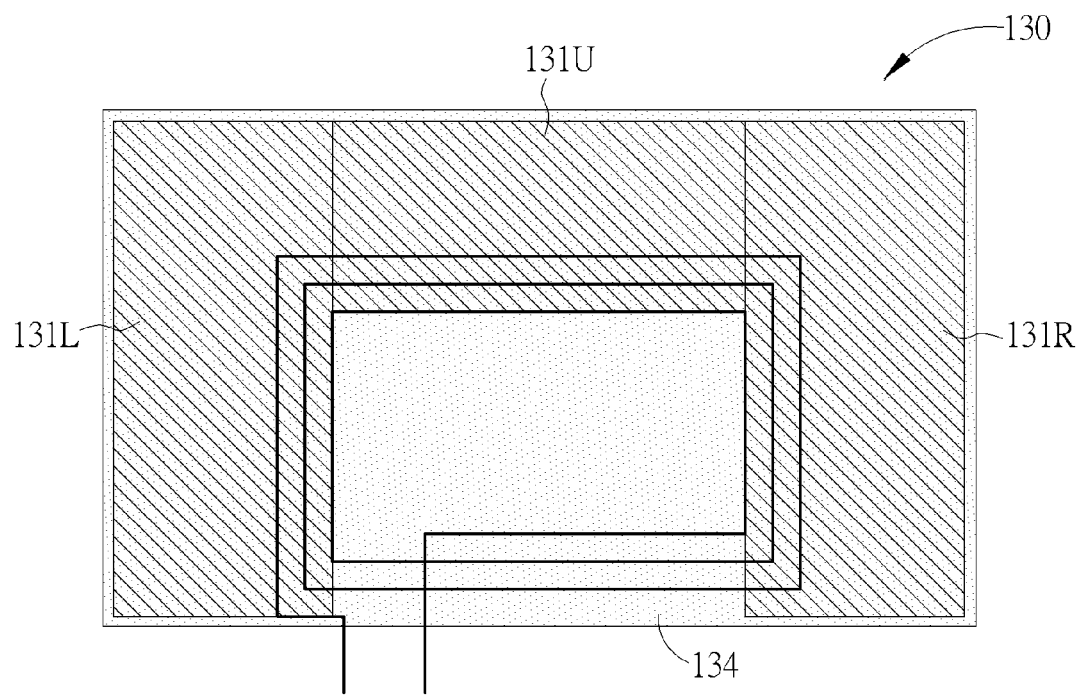
Figure 14:
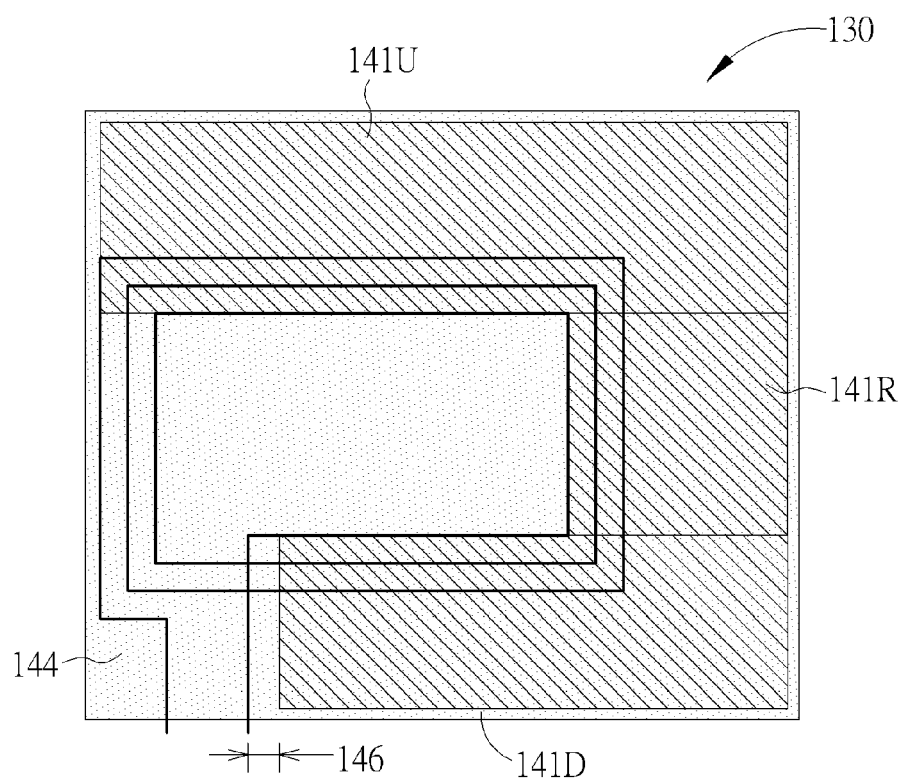
Figure 15:
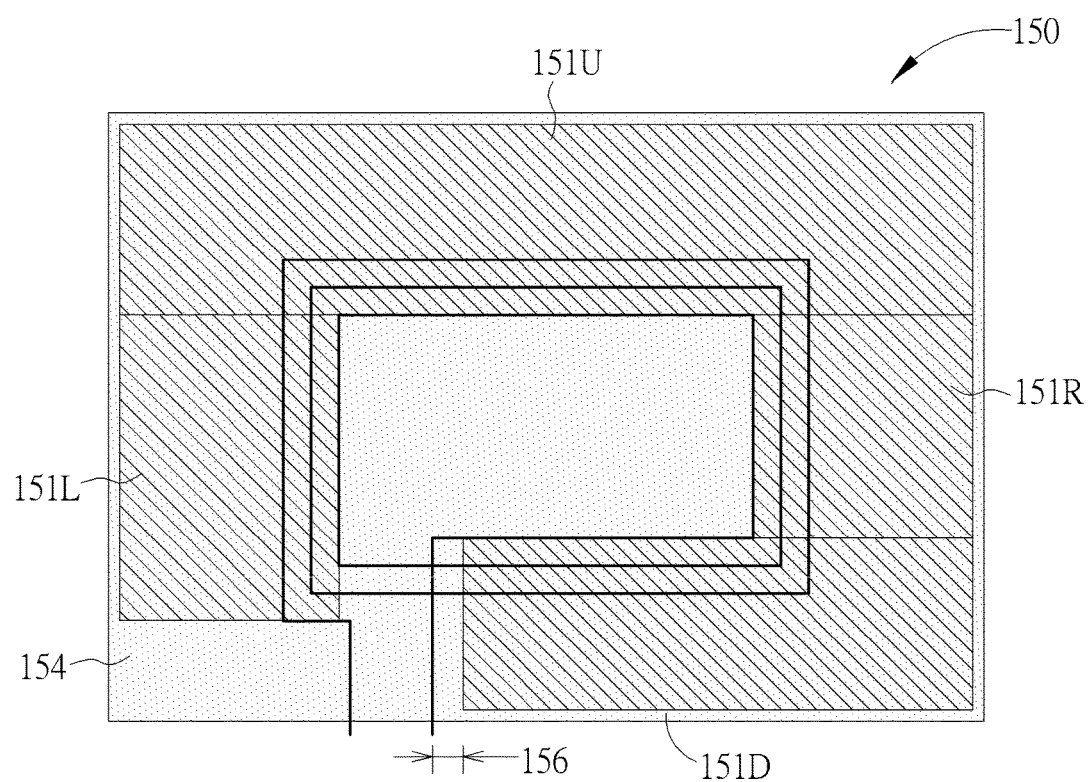
Figure 16:
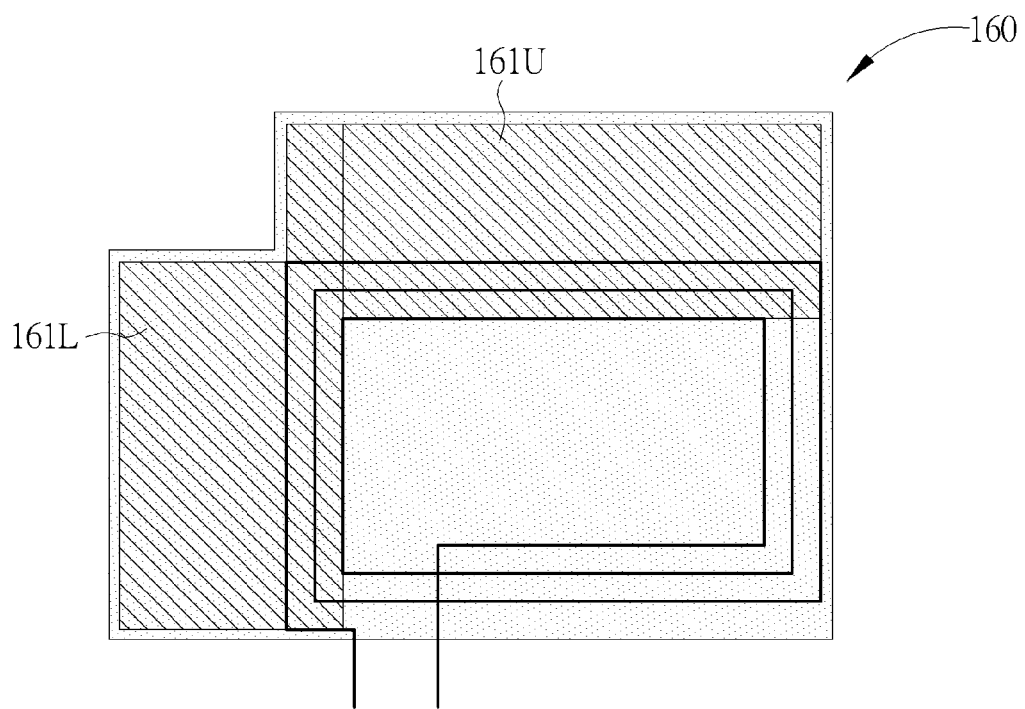
Figure 17:
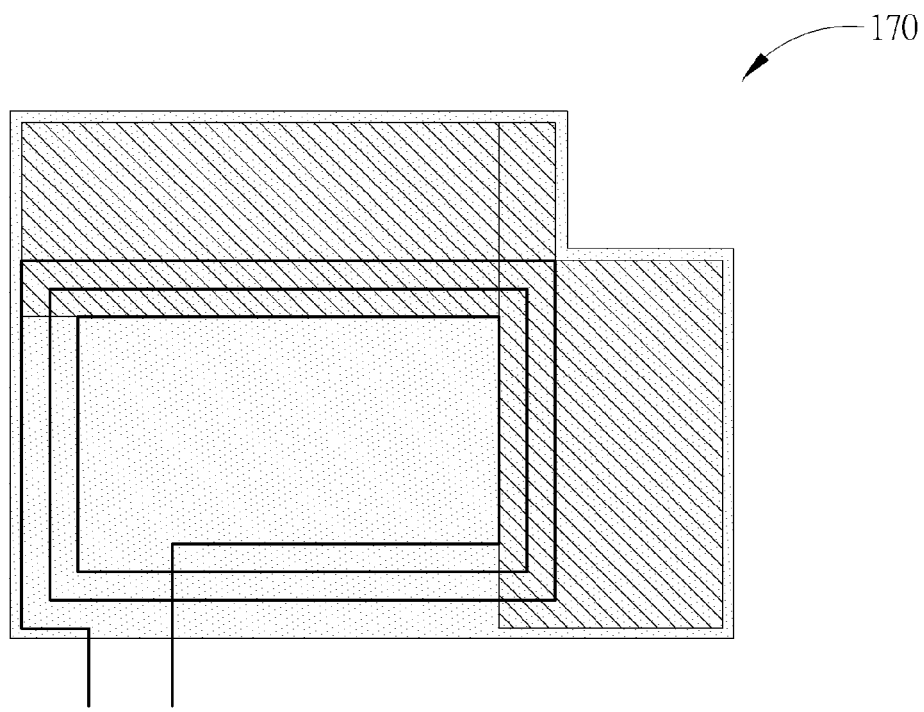
Figure 18:
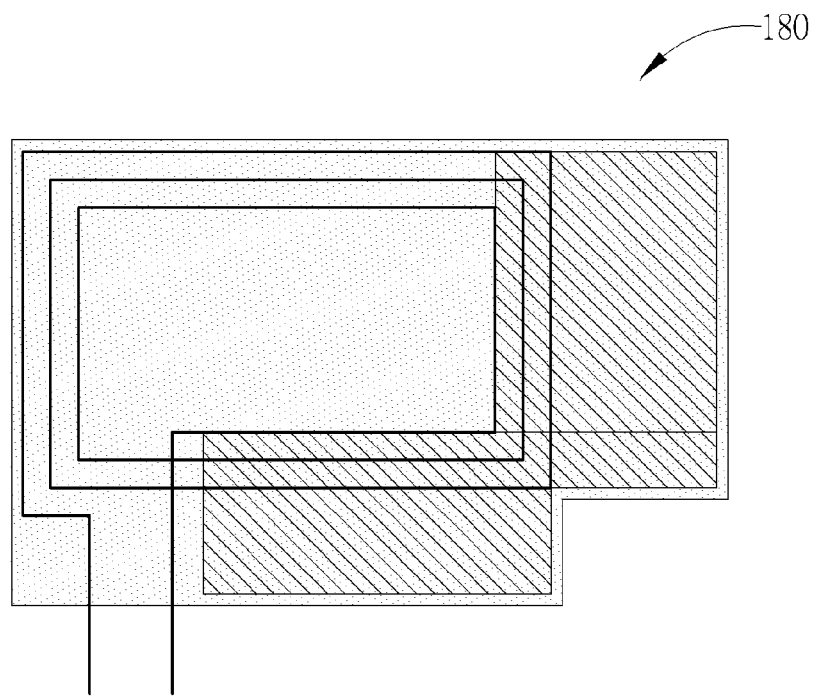
Figure 19:
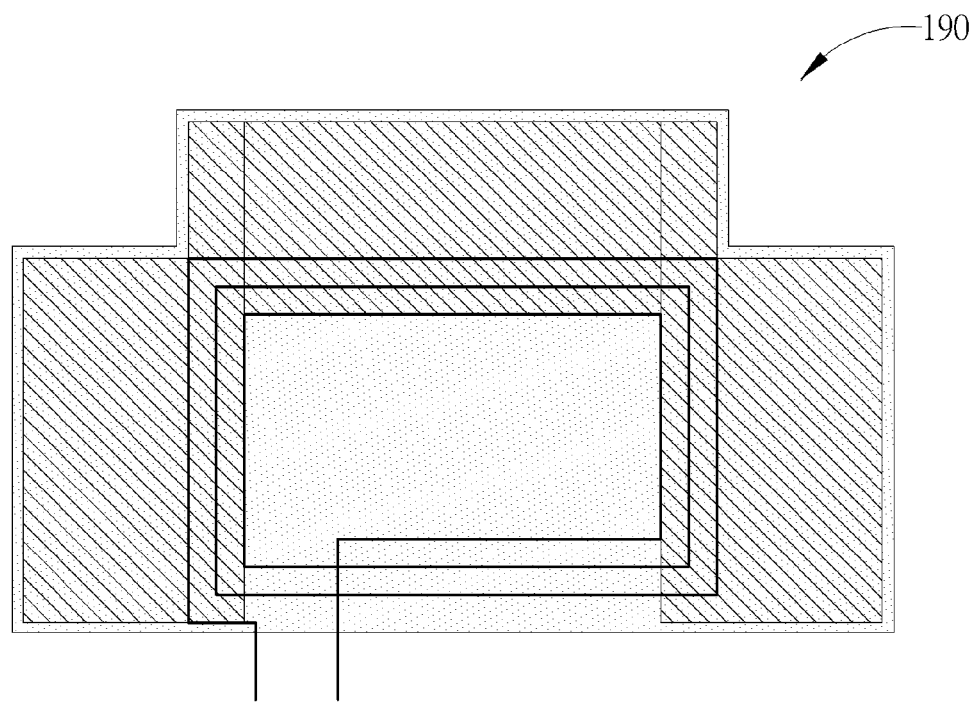
Figure 20:
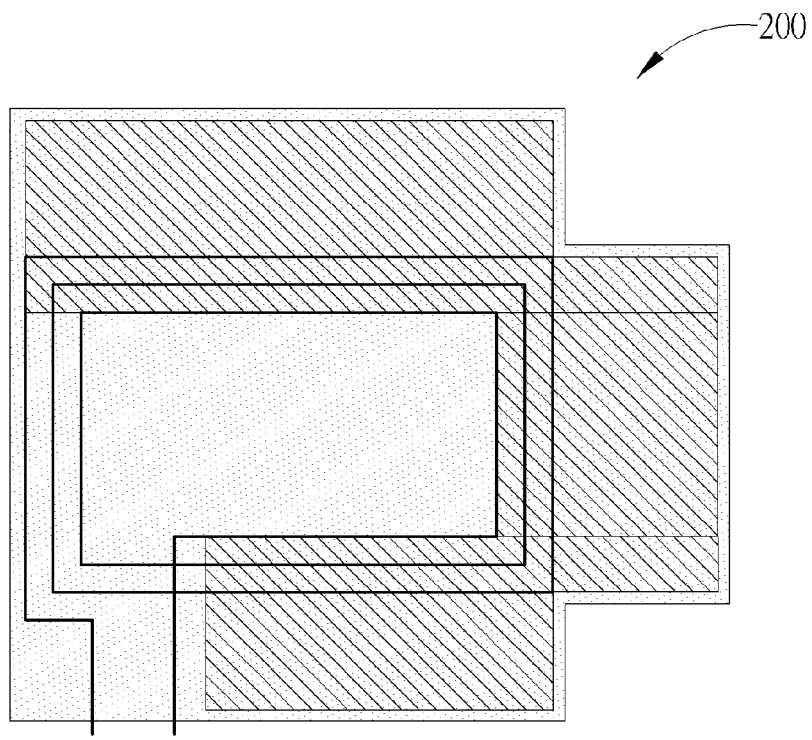
Figure 21:
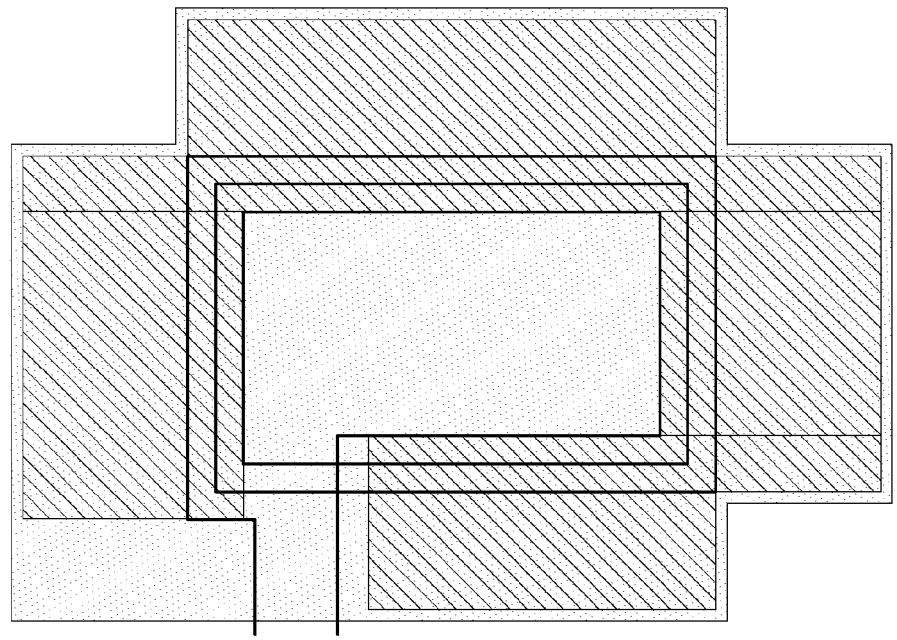

FIG. 5 to FIG. 15 illustrate perspective views of NFC antennas 50-150 having passive boosters according to various embodiments of the present invention. In FIG. 5 to FIG. 8 respectively, the passive booster of the NFC antenna overlaps with one edge of the inner sub-coil of the antenna coil. In FIG. 9 to FIG. 12 respectively, the passive booster of the NFC antenna overlaps with two edges of the inner sub-coil of the antenna coil. In FIG. 13 to FIG. 14 respectively, the passive booster of the NFC antenna overlaps with three edges of the inner sub-coil of the antenna coil. In FIG. 15, the passive booster of the NFC antenna overlaps with four edges of the inner sub-coil of the antenna coil.

Figure 5:
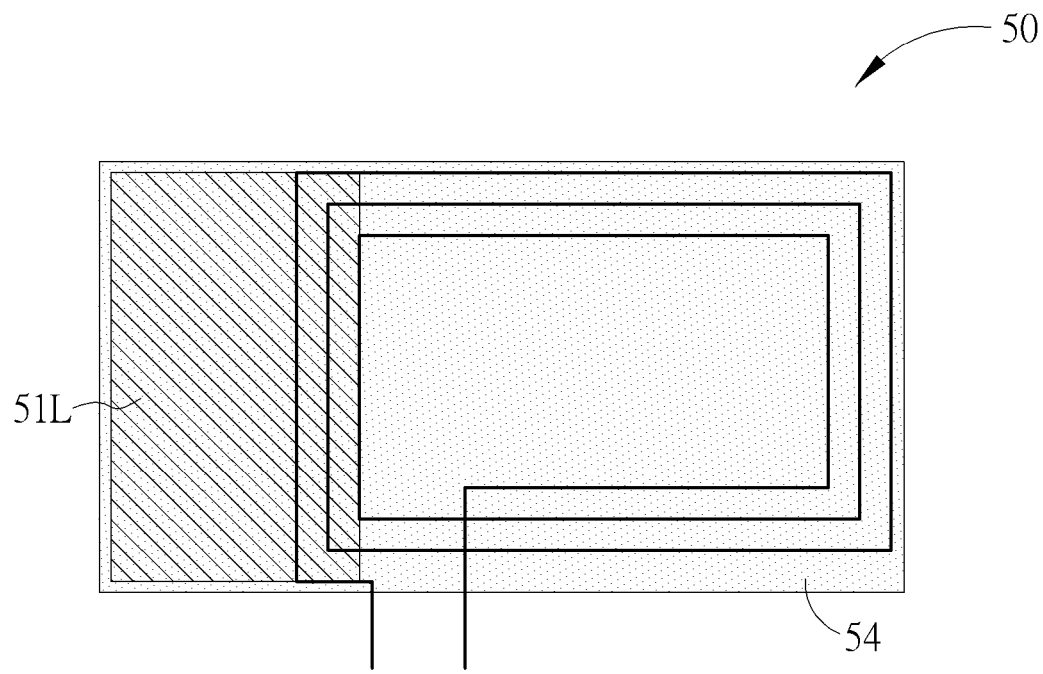
FIG. 5 to FIG. 21 illustrate a perspective view of an NFC antenna having passive booster with various shapes according to various embodiments of the present invention.

In FIG. 5, a conductive sheet 51L of the NFC antenna 50 is overlapped with a left portion of the antenna coil, a right edge of the conductive sheet 51L is aligned with the inner sub-coil of the antenna coil, and upper, lower and left edges of the conductive sheet 51L are within an area of a ferrite sheet 54.

Figure 6:
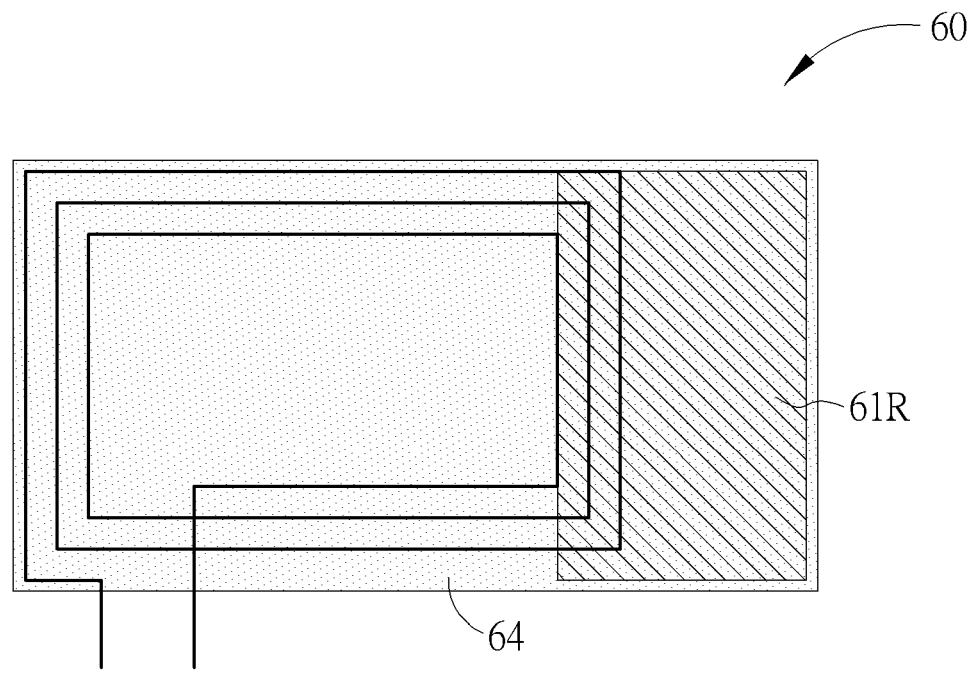

In FIG. 6, a conductive sheet 61R of the NFC antenna 60 is overlapped with a right portion of the antenna coil, a left edge of the conductive sheet 61R is aligned with the inner sub-coil of the antenna coil, and upper, lower and right edges of the conductive sheet 61R are within an area of a ferrite sheet 64.

Figure 7:
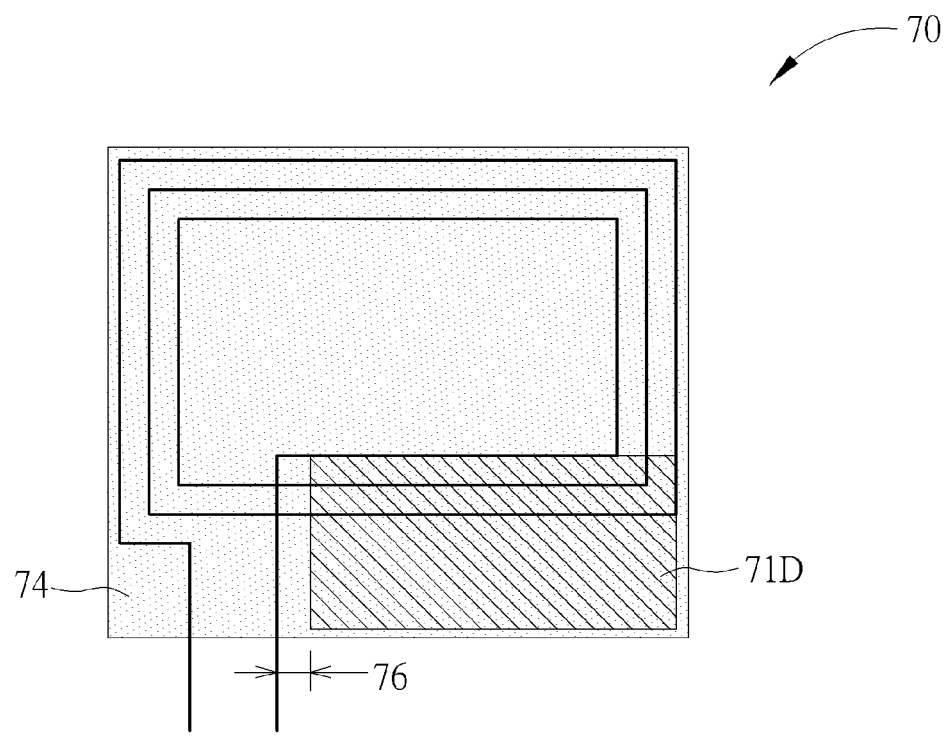
Figure 8:
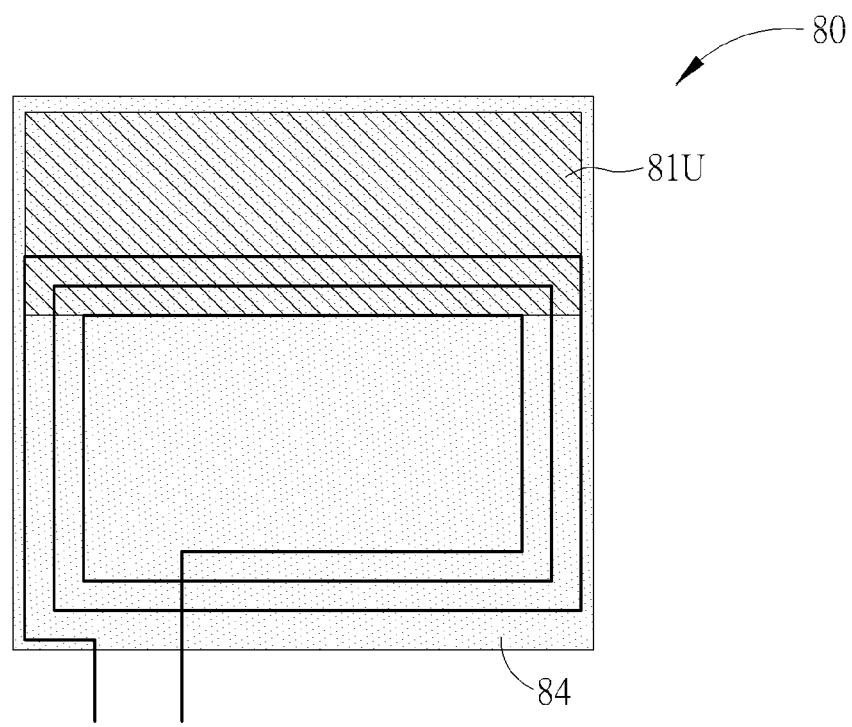

In FIG. 7, a conductive sheet 71D of the NFC antenna 70 is overlapped with a lower portion of the antenna coil, an upper edge of the conductive sheet 71D is aligned with the inner sub-coil of the antenna coil, and right and lower edges of the conductive sheet 71D are within an area of a ferrite sheet 74. Note that a gap 76 is between a left edge of the conductive sheet 71D and feed traces of the antenna coil In FIG. 8, a conductive sheet 81U of the NFC antenna 80 is overlapped with an upper portion of the antenna coil, a lower edge of the conductive sheet 81U is aligned with the inner sub-coil of the antenna coil, and left, right and upper edges of the conductive sheet 81U are within an area of a ferrite sheet 84.

Figure 9:
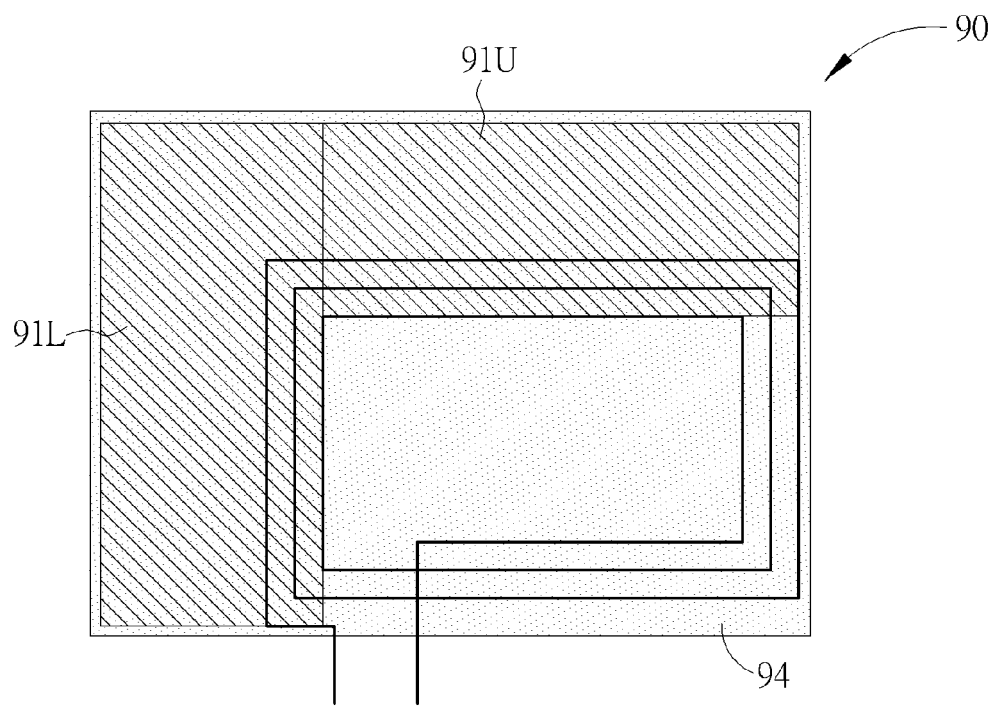

In FIG. 9, conductive sheets 91U and 91L of the NFC antenna 90 are overlapped with upper and left portions of the antenna coil. A lower edge of the conductive sheet 91U is aligned with the inner sub-coil of the antenna coil, a left edge of the conductive sheet 91U is aligned with the inner sub-coil of the antenna coil, and right and upper edges of the conductive sheet 91U are within an area of a ferrite sheet 94. A right edge of the conductive sheet 91L is aligned with the inner sub-coil of the antenna coil, and left, upper and lower edges of the conductive sheet 91L are within the area of the ferrite sheet 94.

Figure 10:
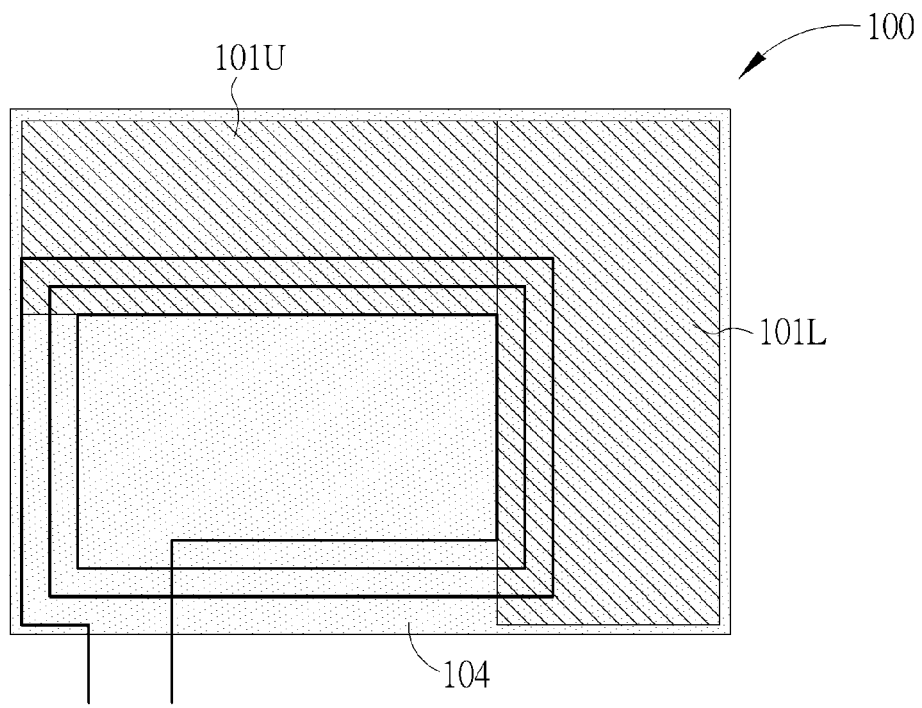

In FIG. 10, conductive sheets 101U and 101R of the NFC antenna 100 are overlapped with upper and right portions of the antenna coil. A lower edge of the conductive sheet 101U is aligned with the inner sub-coil of the antenna coil, a right edge of the conductive sheet 101U is aligned with the inner sub-coil of the antenna coil, and left and upper edges of the conductive sheet 101U are within an area of a ferrite sheet 104. A left edge of the conductive sheet 101R is aligned with the inner sub-coil of the antenna coil, and right, upper and lower edges of the conductive sheet 101R are within the area of the ferrite sheet 104.

In FIG. 11, conductive sheets 111D and 111R of the NFC antenna 110 are overlapped with lower and right portions of the antenna coil. An upper edge of the conductive sheet 111D is aligned with the inner sub-coil of the antenna coil, a gap 116 is between a left edge of the conductive sheet 111D and a first/second feed trace of the antenna coil, and right and lower edges of the conductive sheet 111D are within an area of a ferrite sheet 114. A left edge of the conductive sheet 111R is aligned with the inner sub-coil of the antenna coil, a lower edge of the conductive sheet 111R is aligned with the inner sub-coil of the antenna coil, and right and upper edges of the conductive sheet 111R are within the area of the ferrite sheet 114.

In FIG. 12, conductive sheets 121U and 121D of the NFC antenna 120 are overlapped with upper and lower portions of the antenna coil. A lower edge of the conductive sheet 121U is aligned with the inner sub-coil of the antenna coil, and left, right and upper edges of the conductive sheet 121U are within an area of a ferrite sheet 124. An upper edge of the conductive sheet 121D is aligned with the inner sub-coil of the antenna coil, a gap 126 is between a left edge of the conductive sheet 121D and a first/second feed trace of the antenna coil, and left, right and lower edges of the conductive sheet 121D are within the area of the ferrite sheet 124.

In FIG. 13, conductive sheets 131L, 131U and 131R of the NFC antenna 130 are overlapped with left, upper and right portions of the antenna coil. A right edge of the conductive sheet 131L is aligned with the inner sub-coil of the antenna coil, and left, lower and upper edges of the conductive sheet 131L are within an area of a ferrite sheet 134. Left, lower and right edges of the conductive sheet 131U are aligned with the inner sub-coil of the antenna coil, and an upper edge of the conductive sheet 131U is within an upper edge of a ferrite sheet 134. A left edge of the conductive sheet 131R is aligned with the inner sub-coil of the antenna coil, and upper, right and lower edges of the conductive sheet 131R are within the area of the ferrite sheet 134.

In FIG. 14, conductive sheets 141U, 141R and 141D of the NFC antenna 140 are overlapped with upper, right and lower portions of the antenna coil. A lower edge of the conductive sheet 141U is aligned with the inner sub-coil of the antenna coil, and left, right and upper edges of the conductive sheet 141U are within an area of a ferrite sheet 144. An upper edge of the conductive sheet 141D is aligned with the inner sub-coil of the antenna coil, a gap 146 is between a left edge of the conductive sheet 141D and a first/second feed trace of the antenna coil, and right and lower edges of the conductive sheet 141D are within the area of the ferrite sheet 144. Left, upper and lower edges of the conductive sheet 141R are aligned with the inner sub-coil of the antenna coil, and a right edge of the conductive sheet 141R is within a right edge of the ferrite sheet 144.

In FIG. 15, conductive sheets 151L, 151U, 151R and 151D of the NFC antenna 150 are overlapped with left, upper, right and lower portions of the antenna coil. Right and upper edges of the conductive sheet 151L are aligned with the inner sub-coil of the antenna coil, a lower edge of the conductive sheet 151L is aligned with the outer sub-coil of the antenna coil, and a left edge of the conductive sheet 151L is within a left edge of a ferrite sheet 154. A lower edge of the conductive sheet 151U is aligned with the inner sub-coil of the antenna coil, and left, right and upper edges of the conductive sheet 151U are within an area of the ferrite sheet 154. Left, upper and lower edges of the conductive sheet 151R are aligned with the inner sub-coil of the antenna coil, and a right edge of the conductive sheet 151U is within the area of the ferrite sheet 154. An upper edge of the conductive sheet 151D is aligned with the inner sub-coil of the antenna coil, a gap 156 is between a left edge of the conductive sheet 151D and a first/second feed trace of the antenna coil, and right and lower edges of the conductive sheet 151D are within the area of the ferrite sheet 154.

FIG. 16 to FIG. 21 illustrate perspective views of NFC antennas 160-210 having passive boosters according to various embodiments of the present invention, which is generic from FIG. 9 to FIG. 11 and FIG. 13 to FIG. 15, respectively. In FIG. 16 to FIG. 21, a projection of at least one edge of a conductive sheet onto the X-Y plane is aligned with the projection of the outer sub-coil onto the X-Y plane. Specifically, take FIG. 16 for example, a projection of two edges of a conductive sheet 161L onto the X-Y plane is aligned with the projection of the outer sub-coil onto the X-Y plane, and a projection of one edge of a conductive sheet 161U onto the X-Y plane is aligned with the projection of the outer sub-coil onto the X-Y plane.

In summary of the embodiments of FIG. 2 to FIG. 15, the passive boosters include at least one conductive sheet which is respectively overlapped with at least one portion of the antenna coil, wherein a projection of the passive booster onto a plane does not overlap with a projection of an area enclosed by the inner sub-coil onto the plane, and the projection of the passive booster onto the plane overlaps with a projection of the antenna coil and a projection of the ferrite sheet onto the plane.

In the embodiments of FIG. 2 to FIG. 15, the antenna coils are rectangular-shaped, which is not limited. In another embodiment, the antenna coil may be loop-shaped, elliptic-shaped or formed with any feasible shapes. A shape of the ferrite sheet is not limited, which depends on a housing structure of the NFC device. In one embodiment, total area of the conductive sheets shall be greater than one third of an area of the antenna coil. In one embodiment, the antenna coil may be fabricated by printed circuit board (PCB), flexible printed circuit board (FPCB), or metal wire process, etc. In an embodiment, the conductive sheet may be a metal foil such as copper foil, aluminum foil, PCB metal, FPC metal, etc. In an embodiment, the conductive sheet may be integrated with the antenna coil by means of PCB or FPCB fabrication process.

The NFC antenna having passive booster may be applied in portable devices, wearable devices (e.g., watches, necklaces, shoes, bracelets clothes, hats, and so on), digital home products or IOT (Internet of Things) devices such as mobile phone, tablet computer, laptop computer, modem, wired/wireless dongle, television set, personal computer, speakerphone, earphone, headphone, etc.

The NFC antenna having passive booster may be placed nearby a display or screen of device such as liquid crystal display (LCD) device with various types. For example, the type of the display or screen of device may be a thin-Film Transistor (TFT), In-plane Switching (IPS), Super-Twisted Nematic (STN), Twisted Nematic (TN), Vertical alignment (VA), Multi-domain vertical alignment (MVA), Patterned Vertical Alignment (PVA), (SLCD), Liquid Crystal on Silicon (LCOS), Digital Light Processing (DLP), Indium gallium zinc oxide (IGZO), Organic Light-Emitting Diode (OLED) such as Active-Matrix LED (abbreviated as AMO-LED), Super AMOLED, Super AMOLED Plus, Super AMOLED Advanced), Plasma Display Panel (PDP), Surface-conduction Electron-emitter Display (SED), Field Emission Display (FED), Ferroelectric Liquid-crystal Display (FLD), Interferometric Modulator Display (IMOD), Thick-film Dielectric ElectroLuminescent (TDEL), quantum dot (QD) LED, Time multiplexed optical shutter (TMOS), Telescopic Pixel Display (TPD), Organic Light-Emitting Transistor (OLET), Laser Phosphor Display (LPD). In one embodiment, the NFC antenna having passive booster may be placed nearby a Printed Circuit Board Assembly (PCBA) or a Flexible Printed Circuit Board Assembly (FPCBA). In one embodiment, the NFC antenna having passive booster may be placed nearby at least one of back, front, lateral sides of an NFC device, or a back cover of the NFC device.

To sum up, the present invention utilizes the passive booster to induce additional magnetic fields to be superposed with the magnetic field induced by the coil current on the antenna coil, which increases the magnetic field of the NFC antenna and accordingly improves antenna performance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An antenna for near field communication, comprising:
   a ferrite sheet;
   an antenna coil formed on the ferrite sheet comprising a first sub-coil and a plurality of second sub-coils, wherein the first sub-coil is a most inner sub-coil of the antenna coil; and
   a passive booster formed on the ferrite sheet, wherein magnetic fields induced by a coil current on the antenna coil and a coil current on the passive booster direct toward a same direction;
   wherein a projection of the passive booster onto a plane does not overlap with a projection of an area enclosed by the first sub-coil onto the plane;
   wherein the projection of the passive booster onto the plane overlaps with a projection of an area occupied by the plurality of second sub-coils, and completely overlaps with a projection of the ferrite sheet onto the plane.

2. The antenna of claim 1, wherein the antenna coil comprises:
   a third sub-coil enclosing the plurality of second sub-coils, wherein the third sub-coil is a most outer sub-coil of the antenna coil;
   a first trace connected to the first sub-coil; and
   a second trace connected to the third sub-coil;
   wherein either the first trace or the second trace is connected a feed point, and either the second trace or the first trace is connected to a ground for single end radio-frequency (RF) network application;
   wherein the first trace or the second trace is connected two feed points, respectively for differential RF network application.

3. The antenna of claim 2, wherein the passive booster comprises at least one conductive sheet, and each of the at least one conductive sheet comprises:
   a first edge, wherein a projection of the first edge onto the plane is aligned with the projection of the inner sub-coil onto the plane or overlap the projection of antenna coil on to the plane; and
   a plurality of second edges, wherein a plurality of projections of the plurality of second edges onto the plane is within the projection of the ferrite sheet onto the plane.

4. The antenna of claim 3, wherein the first trace or second trace is adjacent to one of the at least one conductive sheet, and a gap is between the first trace or second trace and one of the plurality of second edges.

5. The antenna of claim 3, wherein the antenna coil shape is at least one of a square shape, circle shape, elliptic shape, multiple shape, and rectangle shape with two feeds.

6. The antenna of claim 3, wherein an area of the total conductive sheets is greater than one third of an area of the antenna coil.

7. The antenna of claim 3, wherein a projection of one of the plurality of second edges onto the plane is aligned with a projection of the outer sub-coil onto the plane.

8. The antenna of claim 1, further comprising a dielectric material formed between the antenna coil and the passive booster to isolate the antenna coil and the passive booster.

9. The antenna of claim 1, wherein the antenna coil is formed between the ferrite sheet and the passive booster.

10. The antenna of claim 1, wherein the passive booster is formed between the ferrite sheet and the antenna coil.

11. The antenna of claim 1, wherein the shape of antenna coil is at least one of a square shape, circle shape, elliptic shape, multiple shape, and rectangle shape with two feeds.

* * * * *